United States Patent [19]
Daijogo et al.

[11] Patent Number: 5,936,696
[45] Date of Patent: Aug. 10, 1999

[54] PROJECTION TYPE DISPLAY APPARATUS

[75] Inventors: Akira Daijogo; Shinsuke Shikama, both of Tokyo, Japan

[73] Assignee: Mitsubishi Denki Kabushiki Kaisha, Tokyo, Japan

[21] Appl. No.: 08/778,267

[22] Filed: Jan. 2, 1997

[30] Foreign Application Priority Data

Jan. 16, 1996 [JP] Japan ................................. 8-004687
Jul. 18, 1996 [JP] Japan ................................. 8-189545

[51] Int. Cl.⁶ .......................... G02F 1/133; G02F 1/1333
[52] U.S. Cl. ......................... 349/161; 349/72; 349/199; 219/497
[58] Field of Search ............................ 349/161, 199, 349/72; 219/497, 506, 505

[56] References Cited

U.S. PATENT DOCUMENTS

| | | | |
|---|---|---|---|
| 4,634,225 | 1/1987 | Haim et al. | 349/161 |
| 4,946,263 | 8/1990 | Vaz et al. | 350/351 |
| 5,767,924 | 6/1998 | Hiroki et al. | 349/5 |
| 5,781,266 | 7/1998 | Nakao et al. | 349/161 |

FOREIGN PATENT DOCUMENTS 5232427  9/1993  Japan .

OTHER PUBLICATIONS

LCPC Projection Display System for HDTV, Proceeding of the 12th International Display Research Conference, pp. 113–116 (1992), by Y. Ooi et al.

A Polymer Network Liquid Crystal poly–CdSe TFT Active Matrix Display, Conference Record of the 1991 International Display Research Conference pp. 215–218 (1991), by J. De Baets et al.

A Hysteresis–Less LCPC Device for a Projection Display, SID '92 Digest, pp. 575–578 (1992), by S. Niiyama et al.

*Primary Examiner*—Tiep H. Nguyen

[57] ABSTRACT

A projection type display apparatus including a heater for heating the liquid crystal light valve. The heater includes a transparent electrically conductive film formed on a transparent substrate and is supplied with electric power therethrough to generate heat. The supplied electric power is controlled in accordance with the temperature of the liquid crystal light valve so that the liquid crystal layer in the liquid crystal light valve is in its optimum operating temperature range. The heater may include a filter through which the illumination luminous flux is incident upon the liquid crystal light valve. The filter passes only visible light when inclined within a certain range of angle with the luminous flux, and passes a progressively large amount of heat rays with increasing deviation of the angle from the certain range. A cold mirror and reflecting mirror may be used in place of the filter. The cold mirror reflects visible light of the illumination luminous flux to the liquid crystal light valve and passes heat rays to the reflecting mirror. The reflecting mirror is at an angle with the heat rays and reflects the heat rays to the liquid crystal light valve. The amount of the heat rays reflected to the liquid crystal light valve may be adjusted by varying the angle at which the heat rays is incident on the reflecting mirror.

20 Claims, 17 Drawing Sheets

PROJECTION TYPE DISPLAY APPARATUS

BACKGROUND OF THE INVENTION

1. Technical Field of the Invention

The present invention relates to a projection type display apparatus for enlarging an image formed by a liquid crystal light valve and projecting the enlarged image onto a screen.

2. Description of the Related Art

FIG. 25 illustrates an optical system of a prior art projection type display apparatus using a single liquid crystal light valve. Referring to FIG. 25, a light source 1 includes an elliptical mirror 12 and a white-light lamp 11. Disposed downstream of the light source 1 are a collimator lens 14, field lens 21, liquid crystal light valve 6, and projection lens 8 in this order, as illustrated in FIG. 25. The liquid crystal light valve 6 includes transparent substrates 62 and 64 and a liquid crystal layer 61 sandwiched between the transparent substrates 62 and 64.

The aforementioned prior art apparatus operates as follows: The light emitted from the white-light lamp 11 is reflected and converged by the elliptical mirror 12 into a light spot I which serves as a circular, plane light source, i.e., a secondary light source when seen from the optical system positioned downstream of the elliptical mirror 12. The light emitted from the spot I is then incident on the collimator lens 14 which in turn converts the incident light into a parallel illumination luminous flux 15. The field lens 21 converts the parallel illumination luminous flux 15 into a converged light beam which passes through the light valve 6. The light valve 6 is driven by a drive circuit to form an image therein in accordance with an input signal. The image from the light valve 6 is then incident upon the projection lens 8. The projection lens 8 enlarges the image and projects the enlarged image onto a screen.

FIG. 26 illustrates a prior art optical system of a projection type display apparatus using three liquid crystal valves (Y. Ooi et al., Proceedings of the 12th, International Display Research Conference, pp. 113–116 (1992)). Elements similar to those in FIG. 25 have been given similar reference numerals.

The prior art optical system of FIG. 26 operates as follows: The luminous flux emitted from the white-light lamp 11 is reflected and converged by the elliptical mirror 12 into the light spot I and is then reflected by a mirror 13 to a collimator lens 14. The collimator lens 14 converts the incident light into a parallel luminous flux 15 which is then separated into three primary colors, i.e., red, green, and blue by dichroic mirrors 2GR and 2G. The light of the primary colors is then incident on the liquid crystal light valves 6R, 6G, and 6B through field lenses 21R, 21G, and 21B, respectively. The blue light is reflected by a mirror 3 into the field lens 21B. The liquid crystal light valves 6R, 6G, and 6B are each driven by a drive circuit to produce red, green, and blue images, respectively.

The images of the primary colors are then combined into a full color single image by dichroic mirrors 70G, 70GB, and a mirror 4. The full color image is converted by a projection lens 8 into a projection light 9, which is projected as an enlarged full color image onto a screen 10 for viewing. The field lenses 21R, 21G, and 21B convert the parallel illumination luminous flux into converged light so that the light is efficiently incident upon the projection lens 8. The projection lenses 8 shown in FIGS. 25 and 26 may be provided with an aperture stop therein as required.

The aforementioned liquid crystal light valves 6R, 6G, and 6B are formed of liquid crystal material such as TN (Twisted Nematic) type, STN (Super Twisted Nematic) type, or polymer dispersion type liquid crystal. Polymer dispersion type liquid crystal includes PDLC (Polymer Dispersed Liquid Crystal), LCPC (Liquid Crystal Polymer Composite), NCAP (Nematic Curvilinear Aligned Phase), and PNLC (Polymer Network Liquid Crystal). Reference is made to "Conference Record of the 1991 International Display Research Conference, pp 215–218 (1991), by J. De Baets et al." and "SID '92 Digest, pp 575–578 (1992), by S. Niiyama et al." for details regarding polymer dispersion liquid crystals. In addition to the projection type display apparatus shown in FIGS. 25 and 26, a projection type display apparatus using a reflection type liquid crystal light valve is also known.

The problem with liquid crystal light valves using the aforementioned materials is that the characteristics of the material when the material is driven vary depending on their operating temperatures. The respective material has its own optimum operating temperature and its response becomes slower as temperature decreases below the optimum operating temperature. Slower response presents problems such as:

(1) the image resolution is deteriorated when displaying a moving picture, or (2) the preceding image remains superimposed on the following image for a while immediately after switching from one stationary picture to another.

Moreover, the material shows different electrooptic characteristic (relation between the transmittance of the material and the voltage applied to the material) at temperatures outside the optimum operating temperature range. The changes in electrooptic property results in deteriorated brightness and contrast in the displayed image.

It is known that the dispersive power of polymer dispersion type liquid crystals varies with voltage applied thereto and their electrooptic characteristics exhibit hysteresis. Recently, the materials used for polymer dispersion type liquid crystal 15 have been intensively developed in order to solve the hysteresis problem and materials have been developed which operate with practically no problems in displaying images when the materials are used at their optimum operating temperatures. However, the experiments conducted by the inventors of the present invention revealed that such improved materials still exhibited prominently increased hysteresis if they are operated at temperatures below their optimum temperature ranges. In experiment conducted, a liquid crystal projector was used which uses three liquid crystal light valves as shown in FIG. 26. The liquid crystal light valves are formed of LCPC having an optimum operating temperature range of from 30 to 50° C. The projector was placed in an environment of room temperature below 10° C. and was turned on to display a stationary image of a personal computer. When the stationary image is switched from one image to another, the preceding image remained superimposed on the following image for a short time due to hysteresis. In practice, this is a serious problem.

SUMMARY OF THE INVENTION

The present invention was developed in view of the aforementioned drawbacks.

An object of the invention is to provide a projection type display apparatus which compensates for slow response speeds at low temperatures and compensates for deterioration of electrooptic characteristics of the liquid crystal material.

Another object of the present invention is to improve the hysteresis at low temperatures of a projection type display apparatus using a polymer-dispersed liquid crystal material.

Still another object of the present invention is to provide a projection type display apparatus where the surface temperature of the liquid crystal light valve is detected and controlled to automatically increase the temperature of the liquid crystal material in the light valve when ambient temperature is low.

The aforementioned objects are achieved by a projection type display apparatus which comprises a liquid crystal light valve having a light-incident side, a light-exiting side, and an image-forming area sandwiched between the light-incident side and light-exiting side; a heater for heating the liquid crystal light valve to increase the temperature of the image-forming area; and a temperature controller controlling an amount of heat transferred to the liquid crystal light valve so that the temperature of the image forming area is within a predetermined range. An illumination luminous flux is incident upon the light-incident side of the liquid crystal light valve, passes through the image-forming area, and exits the light-exiting side.

The heater may include a transparent electrically conductive film formed on a transparent substrate and a power supply for supplying electric power to the transparent electrically conductive film. The temperature controller may include a temperature detector that detects the temperature of the liquid crystal light valve and a current controller that controls supply of current to the transparent electrically conductive film.

The heat source of the heater may be in the form of heat rays (Lir) contained in the luminous flux that illuminates the liquid crystal light valve. The temperature controller may include a temperature detector which detects the temperature of the image forming area of the liquid light valve and an amount-of-heat-rays controller which controls an amount of heat rays illuminating the liquid crystal light valve.

The heater may include a filter disposed in the path of illumination luminous flux which is incident upon the liquid crystal light valve. The filter is adapted to be at an angle θ with the illumination luminous flux. The filter passes only visible light (Lv) when the angle θ is within a certain range (θ=α), and passes a progressively large amount of heat rays (Lir) with increasing deviation of the angle θ from the predetermined range (θ=α). The amount-of-heat-rays controller includes an inclination controller which varies the angle (θ) to control an amount of heat rays so that the detected temperature is within the optimum temperature range.

The heater may includes a cold filter which reflects visible light (Lv) of the illumination luminous flux and passes heat rays (Lir), and a reflecting mirror which is at an angle with the heat rays (Lir) and reflects the heat rays (Lir) to the liquid crystal light valve. The amount-of-heat-rays controller may include a reflecting-mirror inclination-inclination controller which varies the angle to control an amount of heat rays so that the detected temperature is within the optimum temperature range.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

FIRST EMBODIMENT

Figure 1:
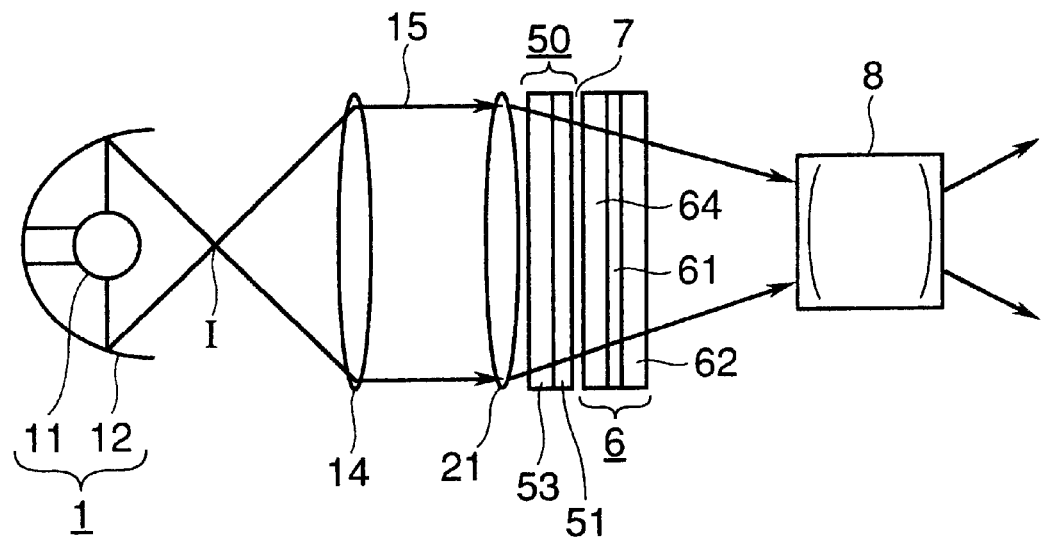
FIG. 1 illustrates an optical system according to a first embodiment of the present invention.

FIG. 1 illustrates an optical system according to a first embodiment of the present invention. A light source 1 includes a white-light lamp 11 and an elliptical mirror 12. The white-light lamp 11 may be a lamp such as a halogen lamp or metal halide lamp.

The luminous flux emitted from the white-light lamp 11 is converged into a light spot I which serves as a circular, plane light source, i.e., a secondary light source when seen from the optical system positioned downstream of the elliptical mirror 12. The light from the light spot I is a divergent light beam and is collimated by a collimator lens 14 into a parallel illumination luminous flux 15. A field lens 21 converts the parallel illumination luminous flux 15 into a converging light beam. The convergent light beam passes through a heater 50 and a gap 7 and is then incident upon a liquid crystal light valve 6. The liquid crystal light valve 6 includes a liquid crystal layer 61 sandwiched between opposed transparent substrates 62 and 64. Drive voltages (not shown) are applied to the liquid crystal layer 61 in column and row directions of a matrix in order to drive each pixel of the liquid crystal layer 61 to form an image therein in accordance with an input signal. When the luminous flux passes through the liquid crystal light valve 6, the luminous flux is modulated by the image. The modulated luminous flux is then incident upon a projection lens 8, which in turn enlarges the image and projects the enlarged image onto a screen.

Figure 2:
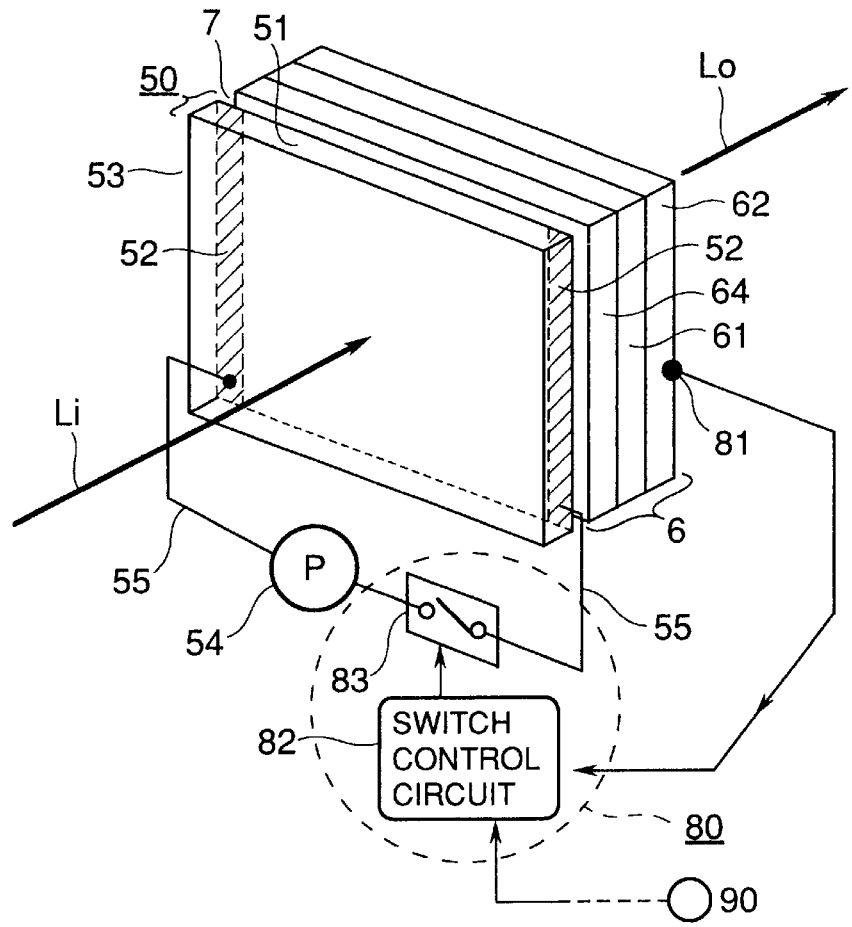
FIG. 2 is a perspective view of a heater and a liquid crystal light valve heated by the heater.

FIG. 2 is a perspective view of the heater 50 and the liquid crystal light valve 6. The heater 50 includes a transparent electrically conductive film 51 formed on the surface of a transparent substrate 53. A power supply 54 supplies electric energy to the transparent electrically conductive film 51 via leads 55 connected to low-resistance electrodes 52. A current controller 80 includes a switch 83 and a switch control circuit 82. The switch control circuit 82 causes the switch 83 to open and close, thereby controlling an amount of current supplied to the heater 50. A temperature sensor 81 is mounted on the surface of the liquid crystal light valve 6. In a preferred embodiment, the temperature sensor 81 is a thermistor. The thermistor is bonded in close contact with, for example, the surface of the transparent substrate 62 by an adhesive and detects the temperature of the transparent substrate 62. The temperature sensor 81 and current controller 80 form a temperature controller which controls the temperature of the liquid crystal light valve 6. Light Li is incident upon the liquid crystal light valve 6 through the heater 50 and light Lo emerges from the liquid crystal light valve 6.

Although the heater 50 directly faces the liquid crystal light valve 6 as shown in FIGS. 1 and 2, the heater 50 may be formed on the other side of the transparent substrate 53 away from the liquid crystal light valve 6.

The temperature sensor 81 outputs a temperature detection signal whose magnitude varies in accordance with the surface temperature of the transparent substrate 62. The temperature detection signal is input to the switch control circuit 82, which closes the switch 83 to supply current to the transparent electrically conductive film 51 when the detected temperature is less than a lower limit of a predetermined temperature range. The transparent electrically conductive film 51 generates heat in accordance with the amount of current supplied thereto.

In FIG. 1, the heater 50 faces the light-incident side of the liquid crystal light valve 6 with a gap 7 between the heater 50 and the transparent substrate 64. Thus, when the temperature of the heater 50 is energized, the heater 50 radiates heat to the transparent substrate 64 so that the temperature of the liquid crystal light valve 6 increases. The switch control circuit 82 controls the switch 83 to open and close in such a way that the detected temperature is maintained within a predetermined temperature range, and therefore the liquid crystal layer 61 is maintained within its optimum operating temperature range thereby ensuring reasonable response speed, electrooptic characteristics, and hysteresis. The liquid crystal layer 61 is promptly heated to a temperature within its optimum operating temperature range when ambient temperature is low, and may be cooled by a ventilation section which forces air into the gap 7 when the temperature of the liquid crystal layer 61 rises beyond its optimum operating temperature range. The aforementioned temperature control operation provides a good projection image.

In order to maintain the detected temperature within the predetermined temperature range, the switch control circuit 82 continuously monitors the temperature detection signal to control the switch 83 to open and close in accordance with the temperature detection signal, the switch 83 being closed when the detected temperature is below the lower limit of the predetermined range and opened when the detected temperature is above a higher limit of the predetermined range. Alternatively, the switch control circuit 82 may be designed to vary the time length during which the switch 83 is closed, in accordance with the ambient temperature which is detected by a sensor 90 before the heater 50 is energized.

The transparent electrically conductive film 51 is formed by depositing preferably indium tin oxide (ITO) on the surface of the transparent substrate 53 by, for example, vapor deposition, sputtering, or spraying. Indium tin oxide has a low specific resistance and lends itself to implementing the transparent electrically conductive film 51 that requires a high transmittance of visible light. Thus, indium tin oxide is suitable for the present invention in that a large amount of electric power can be supplied to the transparent electrically conductive film 51 for the rapid temperature rise of the film 51 while still maintaining the same efficiency of light utilization. One effective way of increasing the transmittance of the transparent electrically conductive film 51 is to make the film 51 thinner and apply a non-reflecting coating on both surfaces of the heater 50.

The inventors of the present invention confirmed that a high transmittance of about 95% can be obtained for visible light in the range of 400–700 nm when a non-reflecting coating of indium tin oxide in the form of a thin film (sheet resistance of 25 ohms/□) is applied on a glass substrate (Corning #7059) by vapor deposition. Sheet resistance is the resistance of a unit square of a thin-film material and is expressed in ohms/□. This heater was disposed as shown in FIG. 1 in close contact with a liquid crystal light valve (1.1 mm-thick substrate) placed in an environment of room temperature (25° C.), and changes in the temperature of the liquid crystal light valve 6 were observed. The temperature of the liquid crystal light valve 6 increased by 7, 13, and 22° C. for applied voltages 5, 7, and 10 volts, respectively, three minutes after the application of the voltages. These temperature increases are reasonable and fast enough for practical use.

Figure 3:
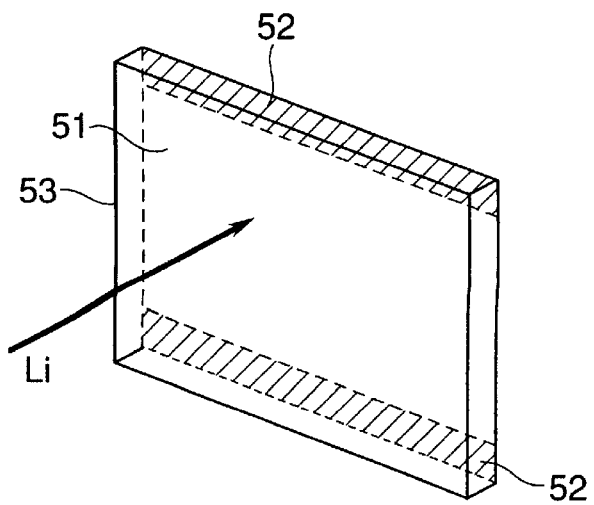
FIG. 3 illustrates the electrodes disposed on the longer opposed sides of the transparent electrically conductive film shown in FIG. 2.

While the electrodes 52 in FIG. 1 are disposed on the opposed shorter sides of the rectangular liquid crystal light valve 6, the electrodes 52 may alternatively be disposed on the opposed longer sides as shown in FIG. 3. This arrangement of the electrodes 52 results in lower resistance of the transparent electrically conductive film 51 for the same thickness of the film 51. The lower resistance draws a larger current from the constant voltage power supply 54. The larger current generates a larger amount of heat, allowing accelerated temperature rise of the liquid crystal light valve 6.

SECOND EMBODIMENT

Figure 4:
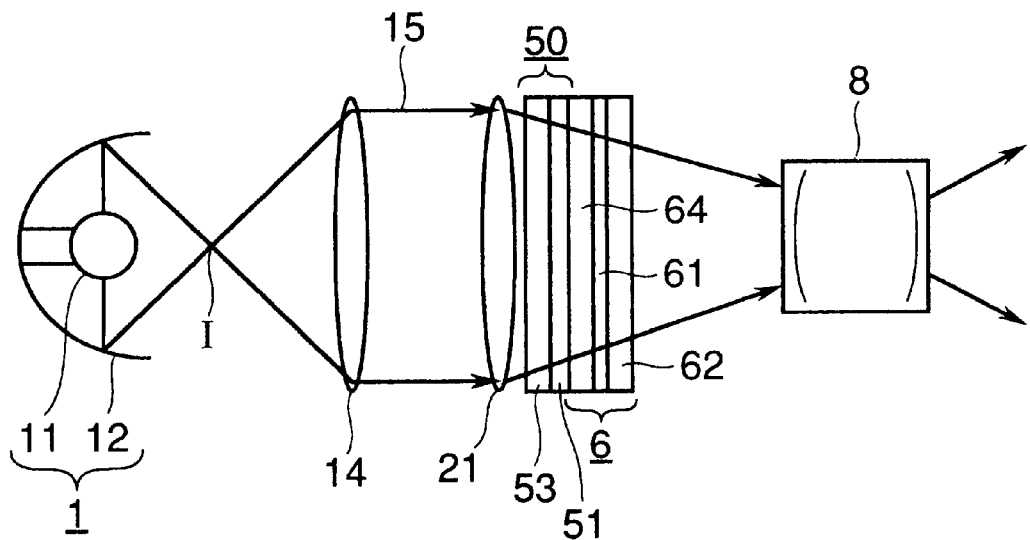
FIG. 4 illustrates an optical system of a second embodiment.

FIG. 4 illustrates an optical system of a second embodiment of a projection type display apparatus according to the present invention. Elements similar to those in FIG. 1 have been given similar reference numerals. In the second embodiment, there is no gap between the heater 50 and the liquid crystal light valve 6, i.e., the transparent electrically conductive film 51 is in direct contact with the transparent substrate 64.

The direct contact of the transparent electrically conductive film 51 with the transparent substrate 64 improves heating efficiency so that the liquid crystal layer 61 is heated to the optimum temperature quicker in the second embodiment than in the the first embodiment.

THIRD EMBODIMENT

Figure 5:
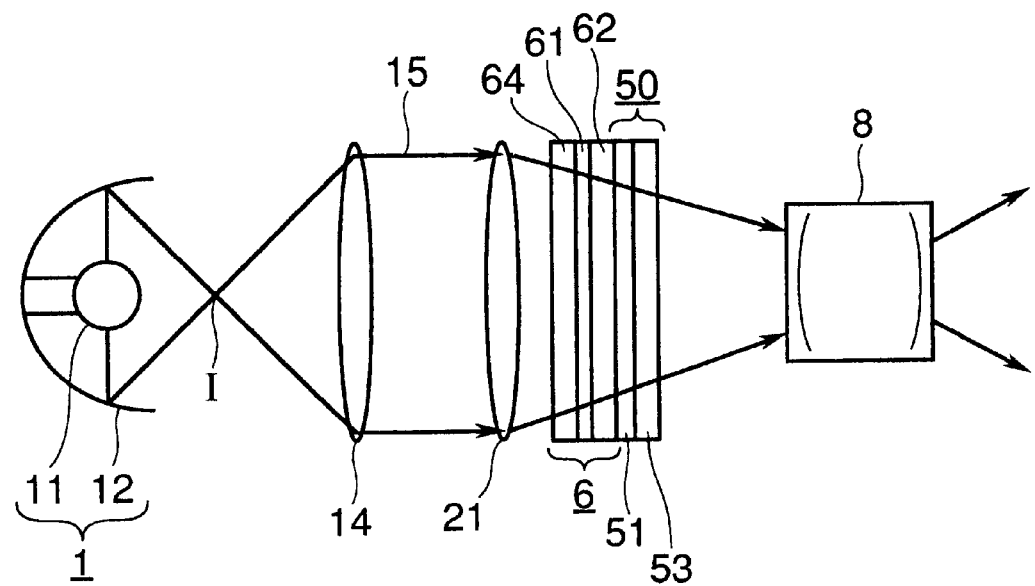
FIG. 5 illustrates an optical system of a third embodiment.

FIG. 5 illustrates an optical system of a third embodiment of a projection type display apparatus according to the present invention. Elements similar to those in FIG. 1 have been given similar reference numerals. In the third embodiment, the heater 50 is disposed on the light-exiting side of the liquid crystal light valve 6 and the transparent electrically conductive film 51 is in close contact with the transparent substrate 62, thereby increasing heating efficiency as in the second embodiment and quickly increasing the temperature of the liquid crystal layer 61.

FOURTH EMBODIMENT

Figure 6:
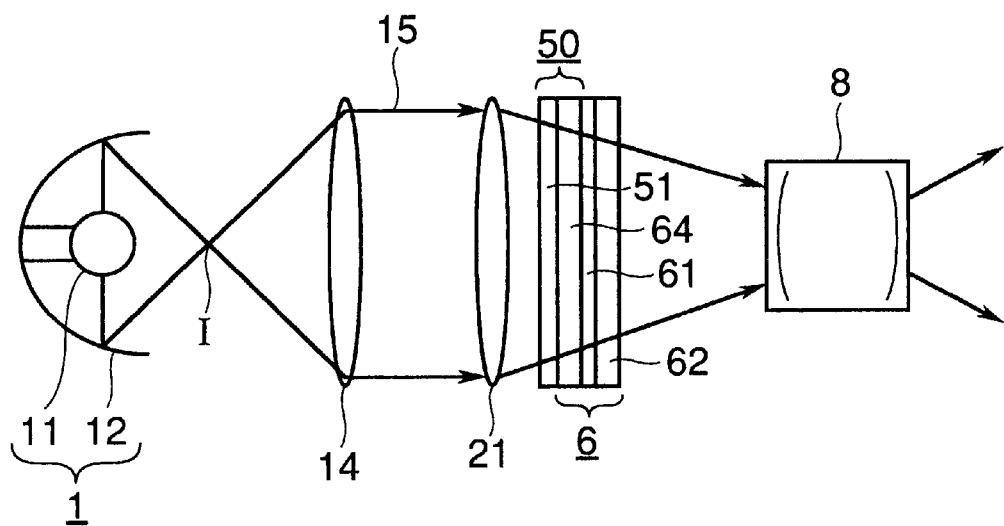
FIG. 6 illustrates an optical system of a fourth embodiment.

FIG. 6 illustrates an optical system of a fourth embodiment of a projection type display apparatus according to the present invention. Elements similar to those in FIG. 1 have been given similar reference numerals. In the fourth embodiment, the transparent electrically conductive film 51 is formed on the light-incident surface of the transparent substrate 64 of the liquid crystal light valve 6.

The fourth embodiment eliminates the transparent substrate 53 required in the second and third embodiments. Therefore, the fourth embodiment saves manufacturing cost of the apparatus and increases heating efficiency of the liquid crystal light valve 6 compared to the second and third embodiments, so that the liquid crystal layer 61 is quickly heated to a temperature within its optimum operating temperature range.

FIFTH EMBODIMENT

Figure 7:
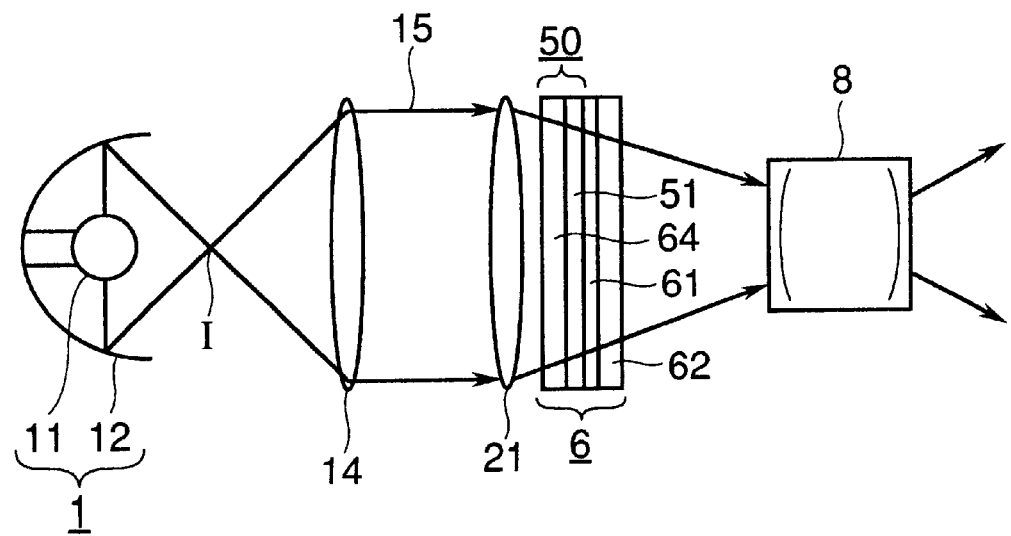
FIG. 7 illustrates an optical system of a fifth embodiment.

FIG. 7 illustrates an optical system of a fifth embodiment of a projection type display apparatus according to the present invention. Elements similar to those in FIG. 6 have been given similar reference numerals. In the fifth embodiment, the transparent electrically conductive film 51 is formed on the light-exiting surface of the transparent substrate 64 placed on the light incident side of the liquid crystal light valve 6.

The fifth embodiment eliminates the transparent substrate 53 required in the second and third embodiments. The transparent electrically conductive film 51 directly heats the liquid crystal layer 61 of the liquid crystal light valve 6. Therefore, the fifth embodiment improves heating efficiency further than the fourth embodiment, so that the liquid crystal layer 61 is quickly heated to a temperature within its optimum operating temperature range.

SIXTH EMBODIMENT

Figure 8:
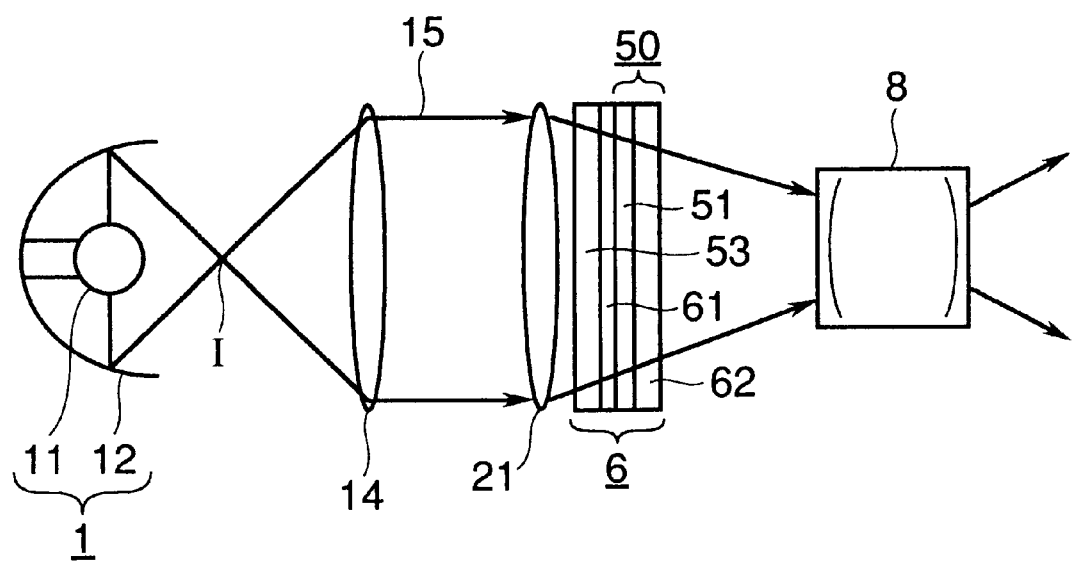
FIG. 8 illustrates an optical system of a sixth embodiment.

FIG. 8 illustrates an optical system of a sixth embodiment of a projection type display apparatus according to the present invention. Elements similar to those in FIG. 6 have been given similar reference numerals. In the sixth embodiment, the transparent electrically conductive film 51 is formed on the light-exiting surface of the transparent substrate 62 placed on the light exiting side of the liquid crystal light valve 6. Therefore, the sixth embodiment also improves heating efficiency further than the fourth embodiment, so that the liquid crystal layer 61 is quickly heated to a temperature within its optimum operating temperature range.

Figure 9:
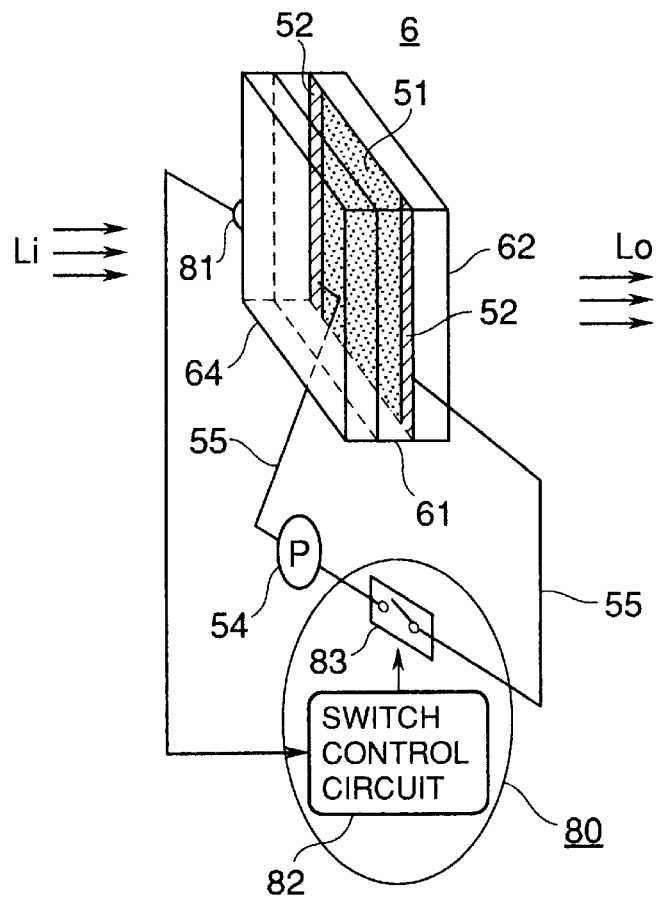
FIG. 9 is a perspective view showing the construction of the liquid crystal light valve in detail.
Figure 10:
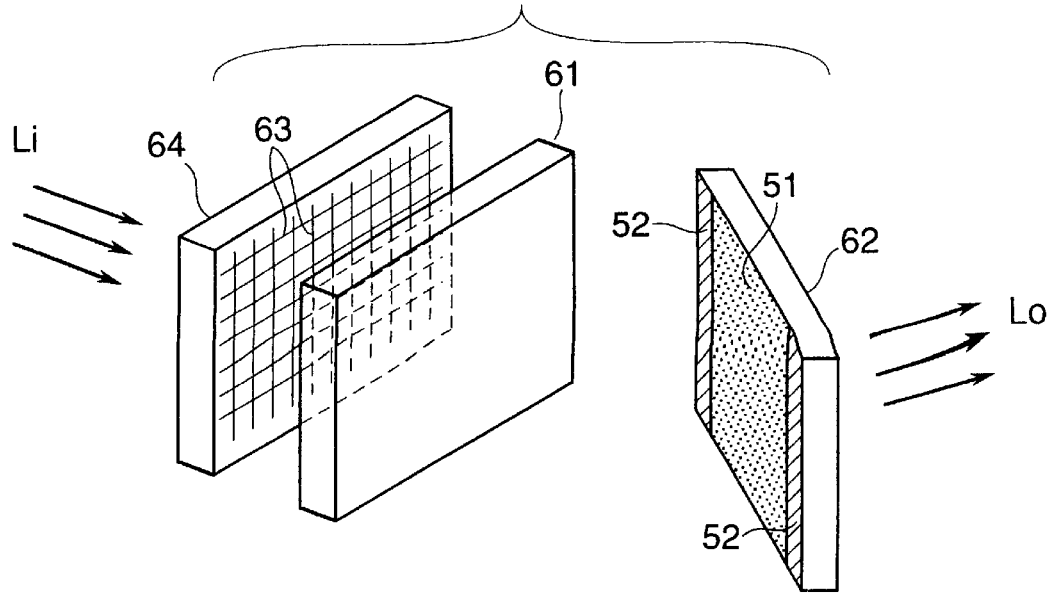
FIG. 10 is an exploded view of the liquid crystal light valve shown in FIG. 9.

FIG. 9 is a perspective view showing the construction of the liquid crystal light valve 6 in detail. FIG. 10 is an exploded view of the liquid crystal light valve 6. A temperature sensor 81, switch control circuit 82, switch 83, power supply 54, and leads 55 are of the same construction as those shown in FIG. 2 and operate in the same way. A liquid crystal layer 61 is sandwiched between a first transparent substrate 64 and a second transparent substrate 62. Light Li is incident upon the liquid crystal light valve 6 and light Lo emerges from the liquid crystal light valve 6. The transparent electrically conductive film 51 is formed on the light-incident surface of the second transparent substrate 62. Electrodes 52 are formed on opposed longitudinal ends of the transparent electrically conductive film 51. A matrix electrode 63 is disposed in row and column directions of a matrix in the light exiting surface of the first transparent substrate 64.

The matrix electrode 63 supplies electric fields to the liquid crystal layer 61 on a pixel-by-pixel basis in accordance with image information. Switching elements such as a thin film transistor (TFT) and a thin film diode (TFD) may be formed at the intersects of the matrix electrode 63 as required so as to improve the ability to store the charge of the displayed image for improved image quality.

The sixth embodiment also eliminates the transparent substrate 53 as in the fifth embodiment. The transparent electrically conductive film 51 directly heats the liquid crystal layer 61 in the liquid crystal light valve 6. Therefore, heating efficiency is improved further in the sixth embodiment than in the fourth embodiment, and facilitates a quick increase of the temperature of the liquid crystal layer 61.

SEVENTH EMBODIMENT

Figure 11:
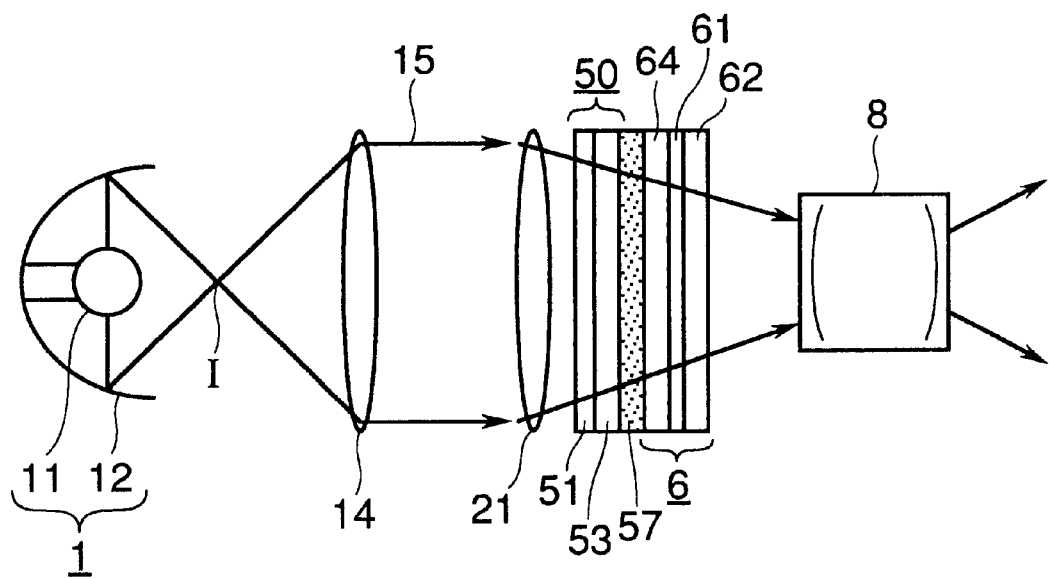
FIG. 11 illustrates an optical system of a seventh embodiment.

FIG. 11 illustrates an optical system of a seventh embodiment of a projection type display apparatus according to the present invention. Elements similar to those in FIG. 6 have been given similar reference numerals. Referring to FIG. 11, the transparent substrate 53 of the heater 50 and the transparent substrate 64 of the liquid crystal light valve 6 are bonded together by a transparent adhesive layer 57 applied therebetween.

The adhesive layer 57 is a transparent adhesive. Such adhesives include epoxy adhesive, modified acrylic adhesive, ultraviolet curing adhesive, silicone adhesive, visible light curing adhesive, and rubber adhesive. Theoretically, any type of adhesive may be used as long as the film of the applied adhesive layer 57 is sufficiently thin.

Significantly decreased overall transmittance of the optical system may result from absorption of light by the adhesive layer, development of bubbles in the bonded interface, or variations in the thickness of the adhesive layer 57. Thus, adhesives having a low viscosity, e.g., less than 1000 cP, should be used in order to ensure high, uniform transmittance over the entire bonded interface.

In order to prevent Fresnel reflection at the bonded interface, it is desirable to use an adhesive having a refractive index close to those of the transparent substrate 64 of the liquid crystal light valve 6 and the transparent substrate 53 of the heater.

Figure 12:
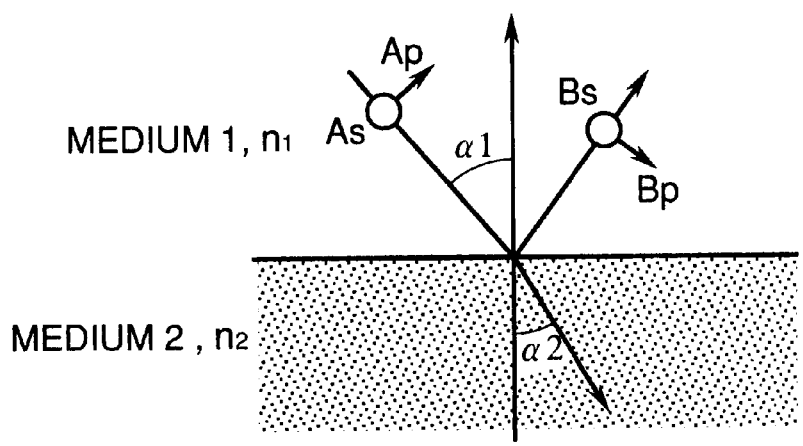
FIG. 12 illustrates reflection at the boundary surface between two media having different refractive indices.

Reflection at the boundary surface between two media having different refractive indices must be considered. As shown in FIG. 12, the boundary conditions of the known Maxwell's equations are applied to the boundary between the two media. Reflectivity R of natural light is given by averaging the reflectivity Rp of a P-polarized component and the reflectivity Rs of an S-polarized component as follow:

$$R = (Rp + Rs)/2 \quad (1)$$
$$= \tan^2(\alpha 1 - \alpha 2)/\tan^2(\alpha 1 + \alpha 2) + \sin^2(\alpha 1 - \alpha 2)/\sin^2(\alpha 1 + \alpha 2)$$

where the P-polarized component is an electric field component of incident light parallel to the plane of incidence, and the S-polarized component is an electric field component of the incident light normal to the plane of incidence. The plane of incidence is the plane parallel to the page of FIG. 12.

In FIG. 12, from the law of refraction, the following relation is derived.

$$\sin(\alpha 2) = (n1/n2)\sin(\alpha 1) \ldots \quad (2)$$

As α1 approaches 0 (α1 becomes 0 when light is incident vertically upon the medium 2), α2 approaches (n1/n2) α1, n1 and n2 being refraction indices of the media 1 and 2, respectively. Therefore, the reflectivity R is given by $$R = (n1-n2)^2/(n1+n2)^2 \ldots \quad (3)$$

A reflectivity of less than 0.5% can be obtained by selecting the refractive index of the transparent substrates 53 and 64 to be about 1.54, and the refractive index Nd of the adhesive layer 57 to be in the range of $$1.35 \leq Nd \leq 1.75 \ldots \quad (4)$$

Figure 13:
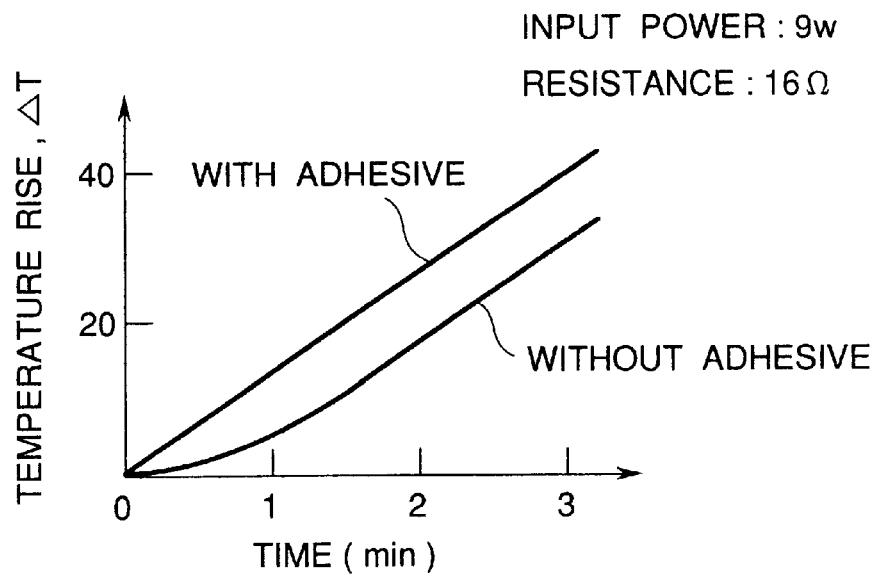
FIG. 13 shows curves of temperature vs. time length for which electric power is supplied to the heater.

In the seventh embodiment, the heater 50 and the liquid crystal light valve 6 are bonded together using a silicone adhesive (SE9187LRTV, viscosity of 1000cP, Nd nearly equal to 1.45, manufactured by Toray-Dow Corning Silicone) which reacts with water contained in air to cure at room temperature. FIG. 13 shows curves of temperature vs. time length for which electric power is supplied to the heater 50. This heater 50 has been bonded to the liquid crystal valve 6 (the thickness of the transparent substrate is 1.1 mm, effective dimension of the screen is 64x48 mm) as shown in FIG. 1. The bonded construction is left at room temperature and temperature changes with time were measured when electric power was supplied thereto. The measurement revealed that providing the adhesive layer 57 between the heater 50 and the liquid crystal light valve 6 improved heat conductivity between the heater and the light valve 6. The temperature of the liquid crystal layer 61 rises faster when the adhesive layer 57 is between the heater 50 and the liquid crystal light valve 6 than when there is an air gap 7 between the heater 50 and the liquid crystal light valve 6.

Silicone adhesives also have reasonable resiliency and therefore advantageously absorb dimensional distortions of the structural elements during rapid heating of the crystal light valve 6.

A visible light curing adhesive (3104 manufactured by LOCKTITE) was also tested to bond the heater 50 and liquid crystal valve 6 together and the test showed similar result to that shown in FIG. 13.

Visible light curing adhesives can be cured using a light source such as a halogen lamp or a metal halide lamp, which is used as the white-light lamp 11. Therefore, this type of adhesive is advantageous in that the adhesive layer 57 will not lose its adhesion when the projector is operating.

An epoxy adhesive (ST-3000 manufactured by TOTO KASEI and B002 manufactured by YUKA SHELL EPOXY) was also tested to bond the heater 50 and liquid crystal light valve 6 together and results similar to that shown in FIG. 13 were obtained.

Epoxy adhesives cure at elevated temperatures and their viscosities are temperature dependent, the viscosity once decreasing before the epoxy adhesive cures. This property is advantageous in that bubbles developed in the adhesive can easily escape therefrom.

In the seventh embodiment, the heater 50 is bonded to one of the two transparent substrates of the liquid crystal light valve 6 by the adhesive layer 57. This construction facilitates transfer of heat from the transparent electrically conductive film 51 to the liquid crystal layer 61 allowing a rapid rise in the temperature of the liquid crystal layer 61.

Selecting appropriate values of the refractive index Nd of the adhesive layer 57 prevents Fresnel reflection that may occur at the boundary between the heater 50 and the liquid crystal light valve 6, thereby increasing efficiency of light utilization.

EIGHTH EMBODIMENT

Figure 14:
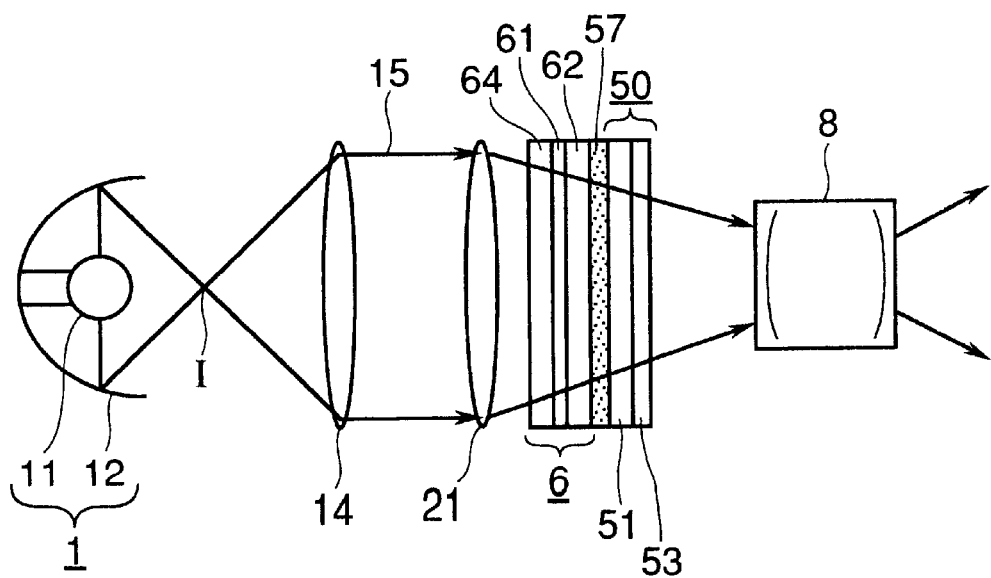
FIG. 14 illustrates an optical system of an eighth embodiment.

FIG. 14 illustrates an optical system of an eighth embodiment of a projection type display apparatus according to the present invention. Elements similar to those in FIG. 11 have been given similar reference numerals. In the eighth embodiment, the heater 50 is bonded by the adhesive layer 57 to the transparent substrate 62 placed on the light-exiting side of the liquid crystal light valve 6. The eighth embodiment was found to be as effective as the seventh embodiment.

NINTH EMBODIMENT

Figure 15:
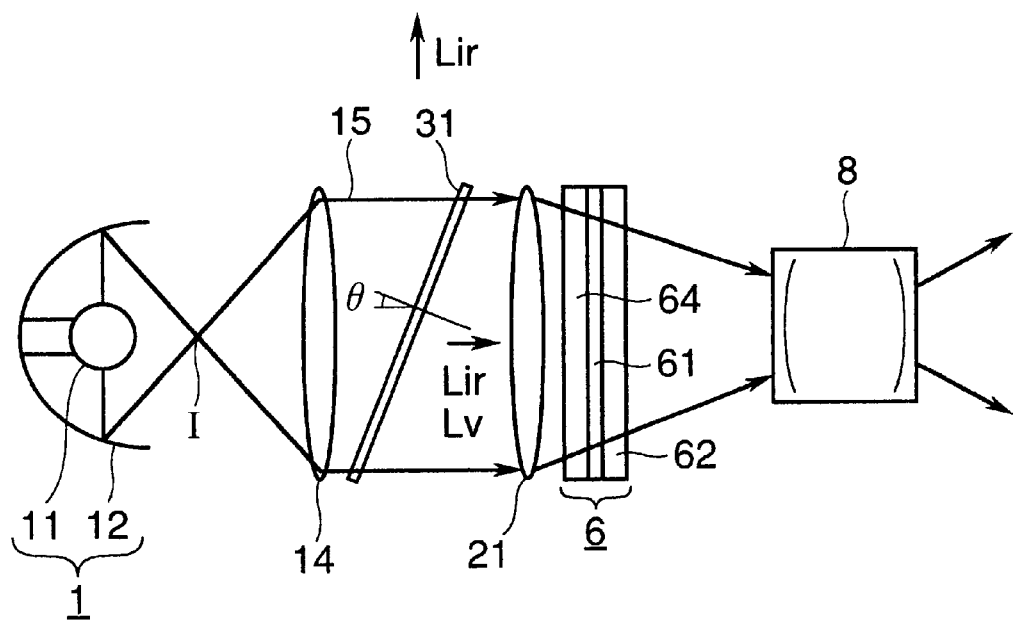
FIG. 15 illustrates an optical system of a ninth embodiment.

FIG. 15 illustrates an optical system of a ninth embodiment of a projection type display apparatus according to the present invention. Elements similar to those in FIG. 1 have been given similar reference numerals. A filter 31, in the form of multilayer films, operates as a heater that uses the heat rays Lir as a heat source. When the incidence angle of the light incident upon the filter 31 is within a certain narrow range, the filter 31 passes only visible light Lv and reflects heat rays Lir.

Figure 16:
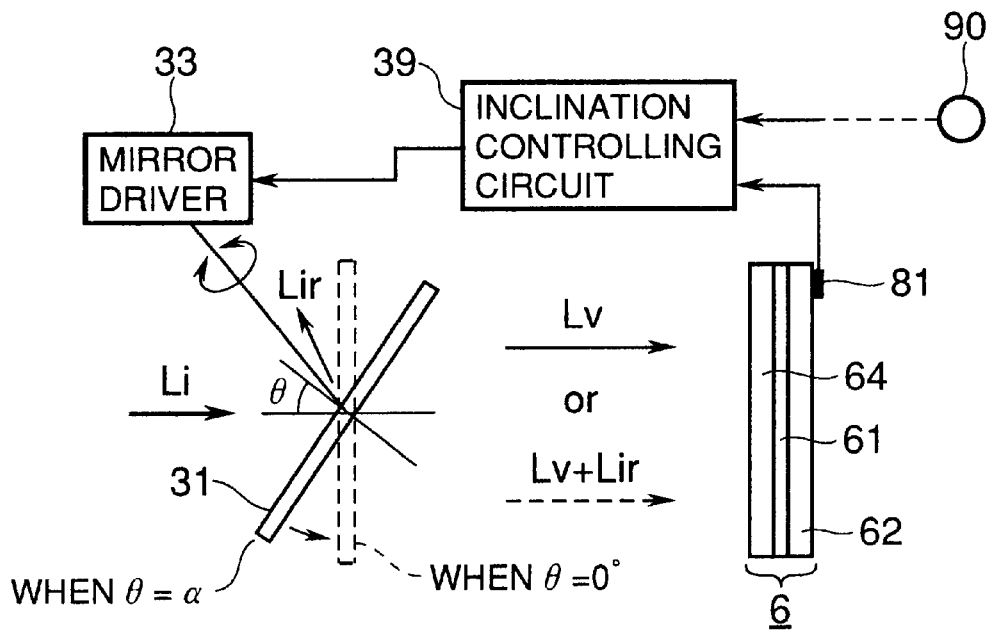
FIG. 16 illustrates the operation of the ninth embodiment.

FIG. 16 illustrates the operation of the ninth embodiment. Referring to FIG. 16, an inclination controlling circuit 39 controls the inclination of the filter 31 in accordance with the temperature detection signal outputted from a temperature sensor 81. A mirror driver 33, for example, a motor, is controlled by the inclination controlling circuit 39 to change the inclination of the filter 31. The inclination controlling circuit 39 and the mirror driver 33 form a an amount-of-heat rays controller. The temperature sensor 81 and the amount of heat rays controller form a temperature controller.

The operation of the ninth embodiment will now be described. Referring to FIG. 15, the luminous flux exiting the white-light lamp 11 is converged by the elliptical mirror 12 into a light spot $\underline{I}$ that operates as a secondary light source. The light emitted from the light spot $\underline{I}$ is a diverging beam of light, which is subsequently collimated by a collimator lens 14 into a parallel illumination luminous flux 15 and is incident on the filter 31. A field lens 21 converts the parallel illumination luminous flux 15 exiting the filter 31 into a converging luminous flux, which is then incident upon the liquid crystal light valve 6. The liquid crystal light valve 6 has a liquid crystal layer 61 sandwiched between opposed transparent substrates 62 and 64. Drive voltages are applied in a known manner, i.e., in row and column directions of a two-dimension matrix to control the liquid crystal layer 61 in accordance with an input signal thereby forming an image in the liquid crystal layer 61. When the luminous flux passes through the liquid crystal light valve 6, the luminous flux is modulated by the image. The luminous flux having the image information is then incident upon a projection lens 8, which in turn enlarges the image and projects the enlarged image onto a screen.

Figure 17:
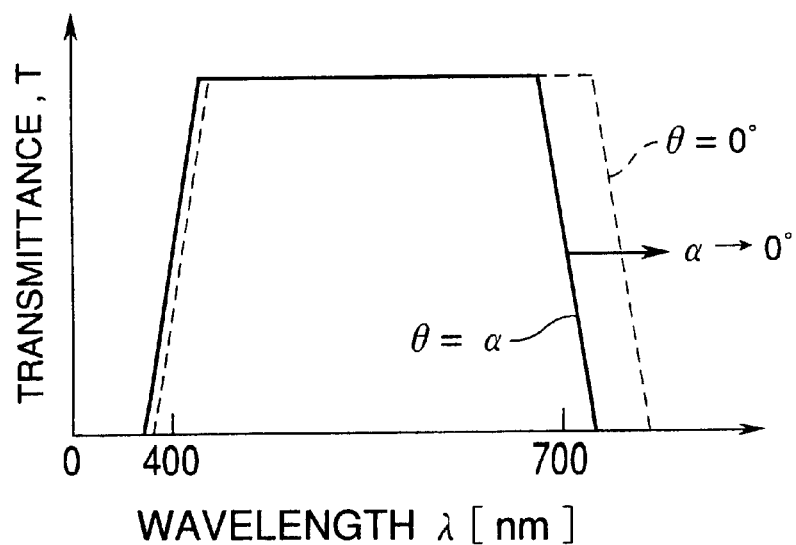
FIG. 17 illustrates the cut-off wavelengths of the filter shown in FIG. 16.

Referring to FIG. 16, when the filter 31 is at the solid line position, light Li is incident at an incidence angle θ=α. The filter 31 passes only visible light Lv and reflects infrared rays or heat rays Lir (wavelengths longer than 700 nm), the cut-off wavelengths of the filter 31 being as depicted by the solid lines in FIG. 17. When the filter 31 is driven by the mirror driver 33 toward the dotted line position so that the incidence angle θ becomes smaller, the filter 31 shows progressively different spectral transmittance characteristic to the same incident light Li, the cut-off wavelengths of the filter 31 shifting to the longer wavelength side as depicted by dotted lines shown in FIG. 17. Thus, more heat rays Lir pass through the filter 31 and illuminate the liquid crystal light valve 6 to increase the temperature of the light valve 6 to a point at which characteristics such as response speed, electrooptic characteristics, and hysteresis of the liquid crystal layer 61 are reasonable to provide a good projection image.

Referring to FIG. 16, the temperature sensor 81 outputs a temperature detection signal to the inclination controlling circuit 39, the temperature detection signal indicating the surface temperature of the liquid crystal light valve 6 as in the first embodiment. If the surface of the liquid crystal light valve 6 is below a lower limit of a predetermined optimum temperature range, the inclination controlling circuit 39 causes the mirror driver 33 to incline the filter 31 so that the light Li is incident on the filter 31 at an incidence angle of θ=0° with the filter 31 and the heat rays Lir heat the liquid crystal light valve 6. If the surface of the liquid crystal light valve 6 is within the predetermined optimum temperature range, the inclination controlling circuit 39 causes the filter to incline so that the light Li is incident at an incidence angle of θ=α thereby passing only visible light therethrough. The time length for which θ=0° is controlled by the inclination controlling circuit 39 in accordance with the temperature detection signal so that prolonged heating will not increase the temperature of the liquid crystal light valve 6 too high.

In order to increase the temperature of the liquid crystal light valve 6, the ninth embodiment employs the heat rays Lir passing through the filter 31, which is a part of the light emitted from the light source 1. Therefore, the ninth embodiment is advantageous in that a heat source such as the heater used in the first to eighth embodiments is not needed.

TENTH EMBODIMENT

Figure 18:
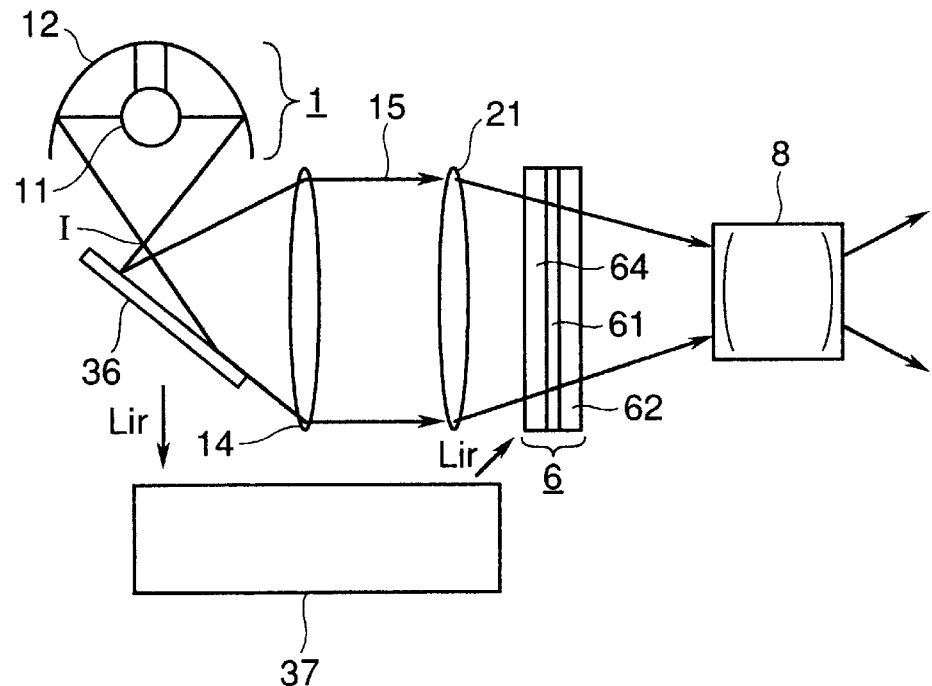
FIG. 18 illustrates an optical system of a tenth embodiment.

FIG. 18 illustrates an optical system of a tenth embodiment of a projection type display apparatus according to the present invention. Elements similar to those in FIG. 1 have been given similar reference numerals. Referring to FIG. 18, a cold mirror 36 passes only heat rays. The cold mirror 36 and a heat rays guiding system 37 form a heater that uses the heat rays Lir as a heat source.

Figure 19:
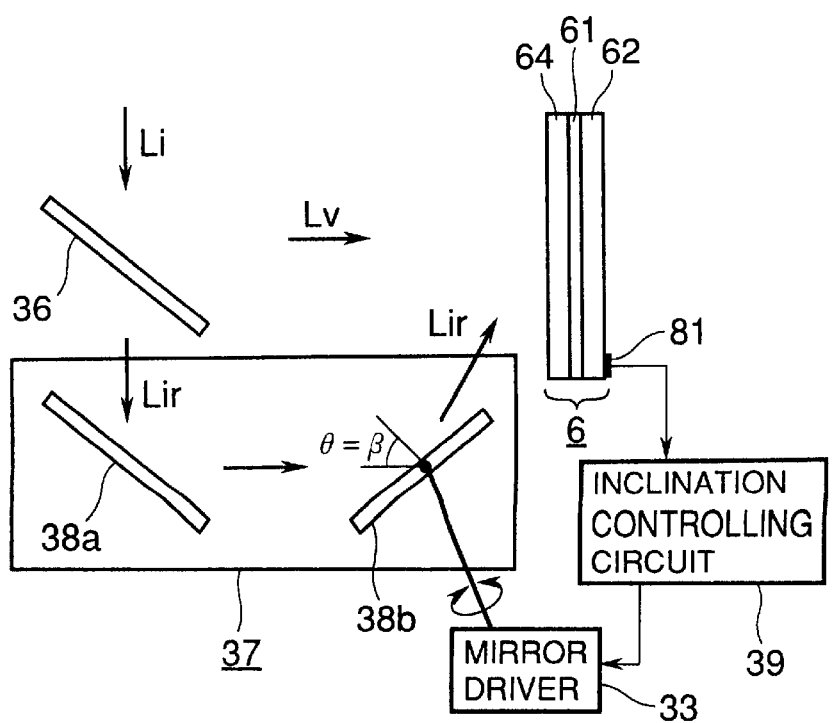
FIG. 19 shows the heat rays guiding system.

FIG. 19 shows an inclination controlling circuit 39, mirror driver 33, and the heat rays guiding system 37, and the temperature sensor 81. The inclination controlling circuit 39 and mirror driver 33 operate as a an amount-of-heat rays controller. The amount-of-heat rays controller and the temperature sensor 81 operate as a temperature controller. The temperature sensor 81 outputs a temperature detection signal indicative of the surface temperature of the liquid crystal light valve 6. The cold mirror 36 is in the form of multilayer films, and reflects visible light Lv and passes heat rays Lir therethrough. The heat rays guiding system 37 includes two reflection mirrors 38a and 38b. The inclination controlling circuit 39 causes the mirror driver 33 to control the inclination of the reflection mirror 38b in accordance with the temperature detection signal.

The operation of the tenth embodiment will now be described. The luminous flux exiting the white-light lamp 11 is converged by the elliptical mirror 12 into a light spot I that operates as a secondary light source. The light emitted from the light spot I is now a diverging light beam and is collimated by a collimator lens 14 into a parallel illumination luminous flux 15. A field lens 21 converts the parallel illumination luminous flux 15 into a converging light beam which in turn is incident upon the liquid crystal light valve 6. The liquid crystal light valve 6 includes a liquid crystal layer 61 sandwiched between opposed transparent substrates 62 and 64. Drive voltages (not shown) are applied in a known manner, i.e., in row and column directions of a two-dimension matrix to drive the liquid crystal layer 61 in accordance with an input signal, thereby forming an image. When the luminous flux passes through the liquid crystal light valve 6, the luminous flux is modulated by the image. The luminous flux having the image information is then incident upon a projection lens 8, which in turn enlarges the image and projects the enlarged image onto a screen.

The heat rays Lir passing through the cold mirror 36 are reflected by the reflection mirrors 38a and 38b to the liquid crystal light valve 6, illuminating the liquid crystal light valve 6 as shown in FIG. 19. The temperature detection signal is directed to the inclination control circuit 39. When the surface temperature of the liquid crystal light valve 6 is below a lower limit of the predetermined optimum temperature range, the circuit 39 controls the mirror driver 33 to incline the reflection mirror 38b in such a way that the heat rays Lir are incident upon the reflection mirror 38b at an incidence angle θ=β and illuminates the liquid crystal light valve 6. When the surface temperature of the liquid crystal light valve 6 is substantially within the predetermined optimum temperature range, the inclination controlling circuit 39 controls the mirror driver 33 in such a way that the heat rays Lir is incident upon the reflection mirror 38b at an incidence angle θ≠β and does not illuminate the liquid crystal light valve 6.

In this manner, the surface temperature of the liquid crystal light valve 6 rises to a point within the predetermined optimum temperature range at which response speed, electrooptic characteristics, hysteresis of the liquid crystal layer 61 is reasonable to provide a good projection image.

The time length for which θ=β is controlled by the inclination controlling circuit 39 in accordance with the temperature detection signal so that prolonged heating by the heat rays Lir will not increase the temperature of the liquid crystal light valve 6 too high.

In order to increase the temperature of the liquid crystal light valve 6, the tenth embodiment uses the heat rays Lir that have passed through the cold mirror 36, the heat rays Lir being a part of the light emitted from the white-light lamp 11. Thus, as in the ninth embodiment, the tenth embodiment is advantageous in that no separate power supply is needed.

ELEVENTH EMBODIMENT

Figure 20:
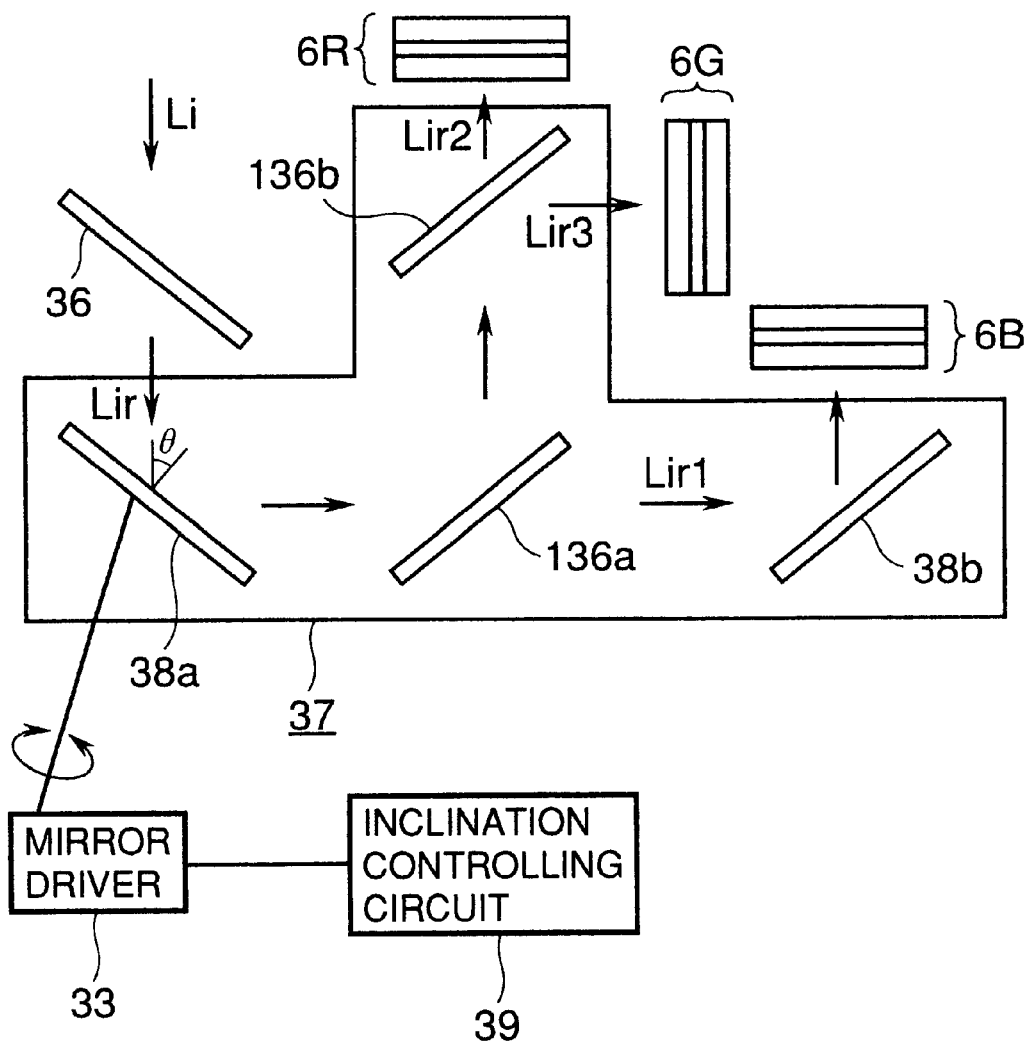
FIG. 20 illustrates a general construction of a heater and temperature controller used in an eleventh embodiment.

Although the tenth embodiment has been described with respect to a projection type display apparatus using a single liquid crystal light valve, the tenth embodiment is also applicable to a projection type display apparatus using three liquid crystal light valves. FIG. 20 illustrates a general construction of a heater and temperature controller used in an eleventh embodiment. Elements similar to those in FIG. 18 have been given similar reference numerals.

Referring to FIG. 20, infrared radiation half-silvered mirrors 136a and 136b are disposed in a heat rays guiding system 37. The inclination controlling circuit 39 receives a temperature detection signal from the temperature sensor 81 mounted on at least one of the liquid crystal light valves 6R, 6G, 6B and causes the mirror driver 33 to vary the inclination θ of the mirror 38a in accordance with the temperature detection signal so as to control the amount of reflected heat rays. The mirror 136a receives the heat rays reflected by the mirror 38a and separates the incident heat rays Lir into heat rays Lir1 and Lir2+Lir3. The heat rays Lir1 is then reflected by the reflecting mirror 38b to the liquid crystal light valve 6B. The heat rays Lir2+Lir3 is separated by the mirror 136b into heat rays Lir2 and Lir3, the heat rays Lir2 illuminating the liquid crystal light valve 6R and the heat rays Lir3 illuminating the liquid crystal light valve 6G.

The eleventh embodiment effectively increases the number of pixels by a factor of three as compared to a projection type display apparatus using a single liquid crystal light valve of the tenth embodiment. The eleventh embodiment lends itself to the implementation of a projection type display apparatus using three liquid crystal light valves where a high definition image is projected and the image-forming area of the liquid crystal light valve is controllably heated to be within an optimum operating temperature range.

TWELFTH EMBODIMENT

Figure 21:
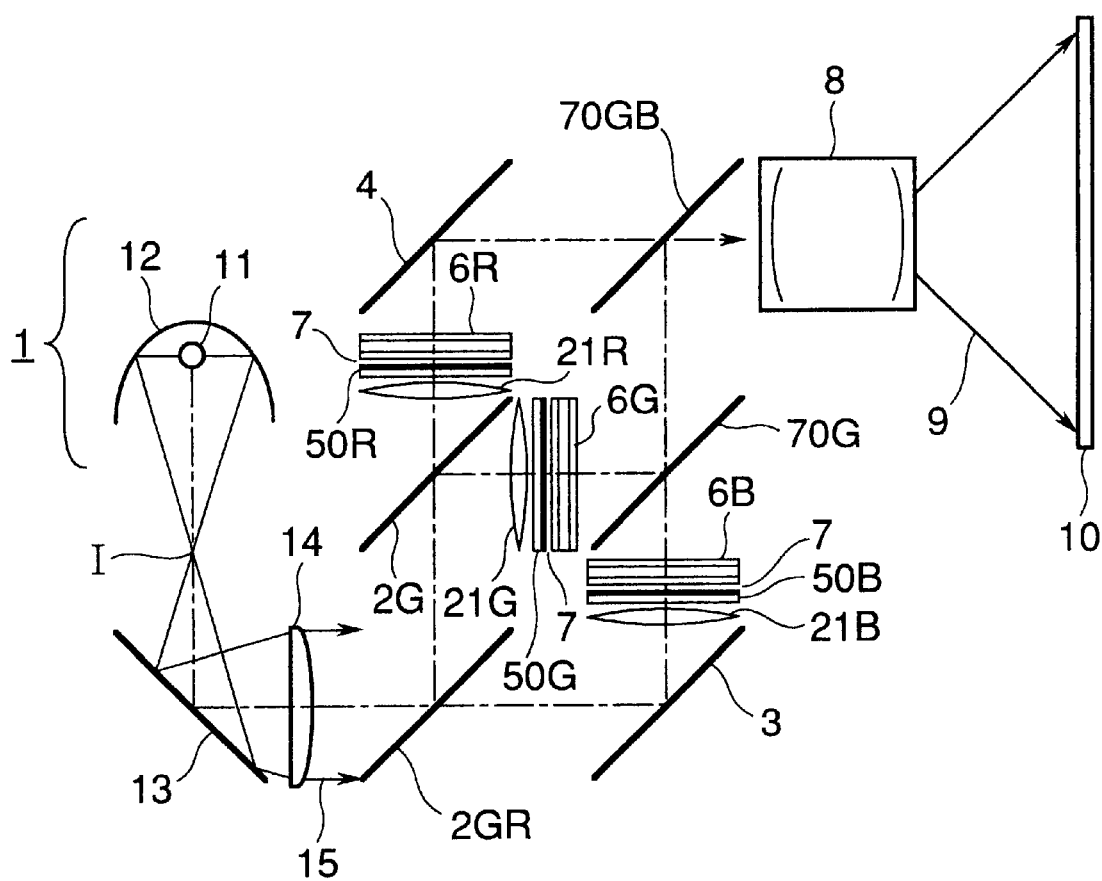
FIG. 21 illustrates an optical system of a twelfth embodiment.
Figure 26:
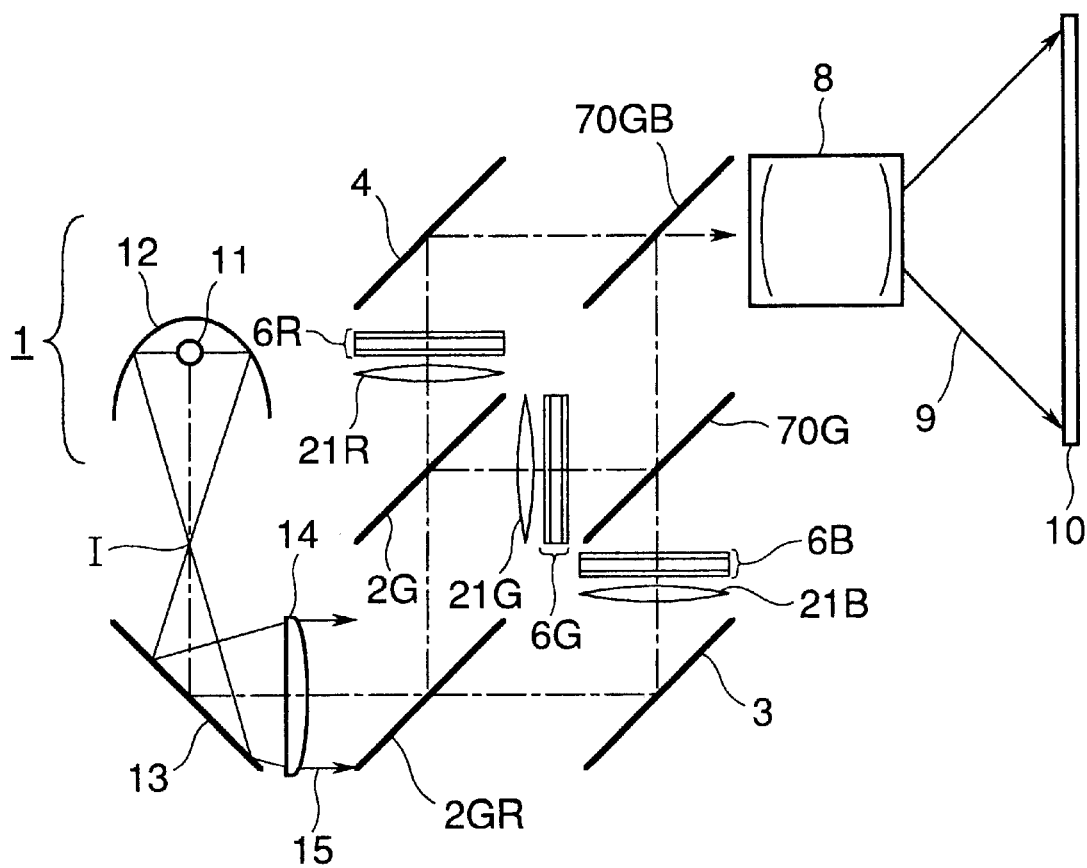
FIG. 26 illustrates a prior art optical system of a projection type display apparatus using three liquid crystal valves.

FIG. 21 illustrates an optical system of a twelfth embodiment 12 of a projection display apparatus. Elements similar to those in FIGS. 1 and 26 have been given similar reference numerals. FIG. 21 further illustrates light 9, representing the enlarged image and screen 10, on which the enlarged image is displayed. Referring to FIG. 21, heaters 50R, 50G, and 50B are a predetermined distance from the light-incident side of the liquid crystal light valves 6R, 6G, and 6B, respectively. Each heater has a transparent electrically conductive film 51 and electrodes 52 provided on the transparent substrate 53 such as those shown in FIG. 2.

The temperature sensor 81, switch control circuit 82, switch 83, and power supply 54 are individually provided for the heaters 50R, 50G, and 50B. The switch control circuits 82 control the switches 83 to open and close in accordance with the detected temperatures of the respective liquid crystal light valves 6R, 6G, and 6B, respectively, so that the temperatures of the liquid crystal light valves 6R, 6G, and 6B are maintained within the predetermined range, respectively. Alternatively, one set of the elements 82–83 and 54 may be provided for the entire apparatus for controlling the temperatures of the liquid crystal light valves 6R, 6G, and 6B, in which case the temperature sensor 81 is provided on at least one of the liquid crystal light valves.

The twelfth embodiment allows implementation of a projection type display apparatus using three liquid crystal light valves, and therefore effectively increases the number of pixels by a factor of three, resulting in a high definition projection image. The twelfth embodiment allows control of the operating temperatures of the image-forming areas of the three liquid crystal light valves so that the image-forming areas are within their optimum operating temperature ranges. Arranging the heaters 50R, 50G, and 50B not in contact with the corresponding liquid crystal light valves 6R, 6G, and 6B offers more degrees of freedom in designing the display apparatus. Such arrangement is advantageous in that when the temperature of the light valve is too high, air can be passed through the gap between the heater and the corresponding liquid crystal light valve for uniform temperature distribution over the surface of the liquid crystal light valve and the air passing through the gap serves to cool down the liquid crystal light valve.

THIRTEENTH EMBODIMENT

Figure 22:
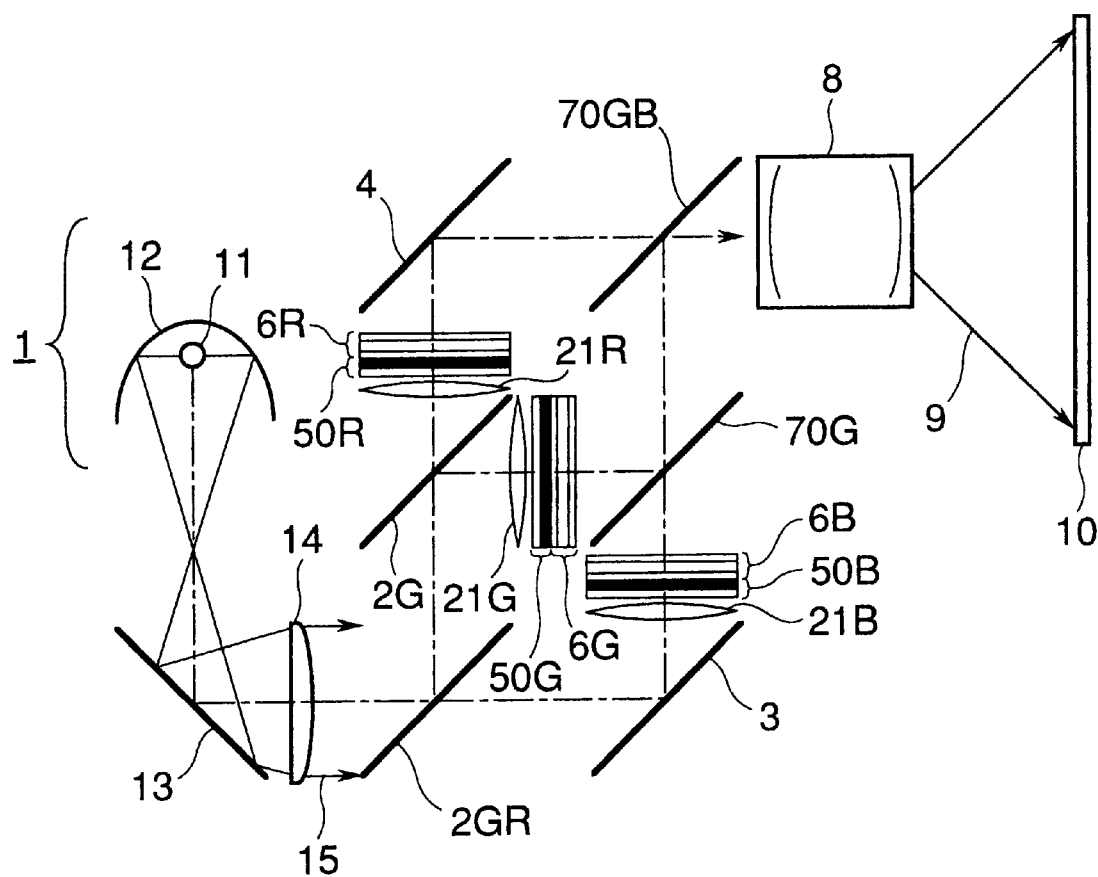
FIG. 22 illustrates an optical system of a thirteenth embodiment.

FIG. 22 illustrates an optical system of a thirteenth embodiment of a projection type display apparatus according to the present invention. Elements similar to those in FIGS. 3 and 26 have been given similar reference numerals. The thirteenth embodiment is an embodiment where the construction in the second embodiment shown in FIG. 4 is applied to a projection type display apparatus using three liquid crystal light valves. The operation and advantages of the second embodiment offer a projection type display apparatus where the image-forming areas of the three liquid crystal light valves are properly controlled to be within their optimum operating temperature ranges.

FOURTEENTH EMBODIMENT

Figure 23:
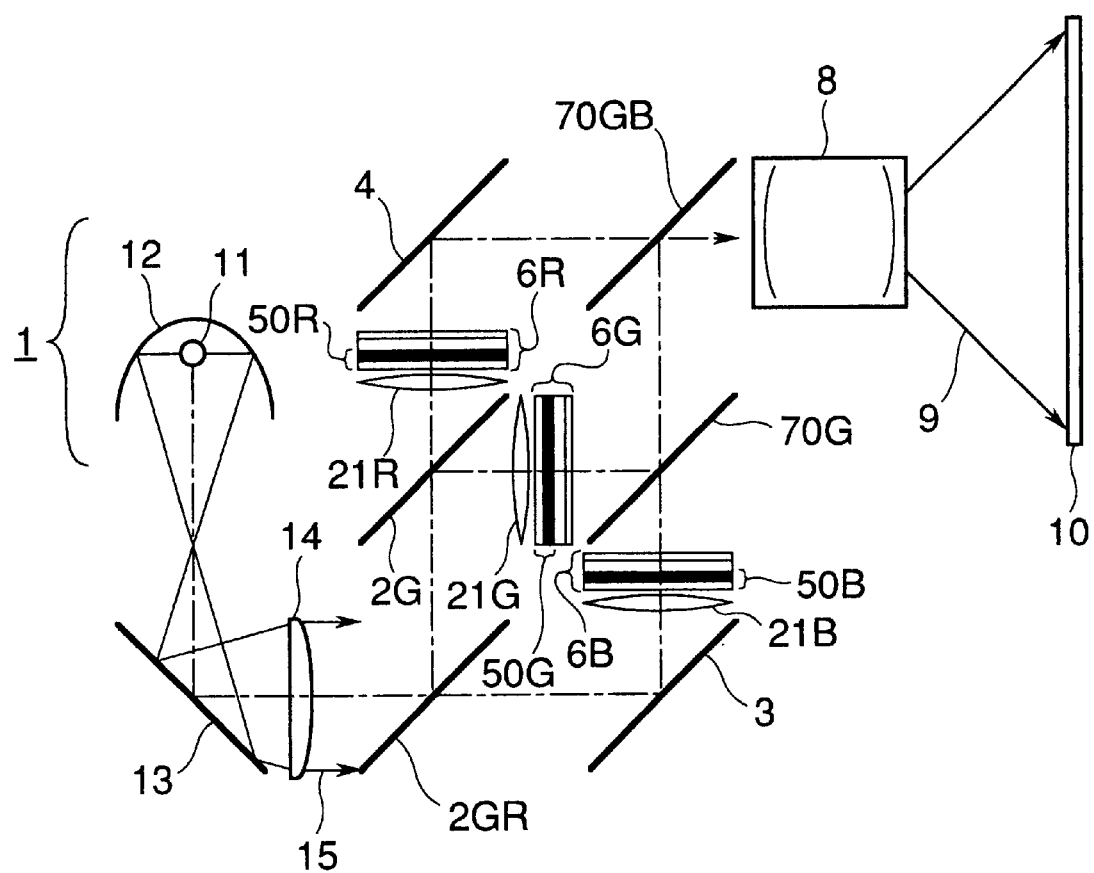
FIG. 23 illustrates an optical system of a fourteenth embodiment.

FIG. 23 illustrates an optical system of a fourteenth embodiment of a projection type display apparatus according to the present invention. Elements similar to those in FIGS. 3 and 26 have been given similar reference numerals. The fourteenth embodiment is an embodiment where the construction in the fifth embodiment shown in FIG. 7 is applied to a projection type display apparatus using three liquid crystal light valves. The operation and advantages of the fifth embodiment offer a projection type display apparatus where the image-forming areas of the three liquid crystal light valves are properly controlled to be within their optimum operating temperature ranges.

FIFTEENTH EMBODIMENT

Figure 24:
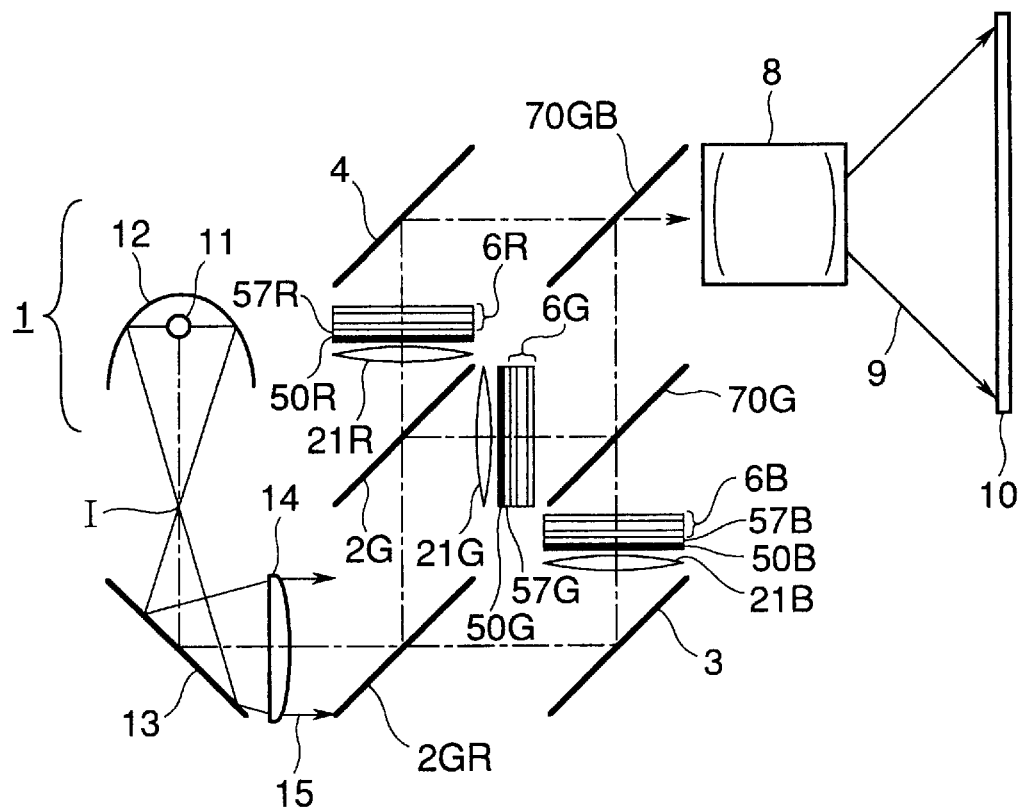
FIG. 24 illustrates an optical system of a fifteenth embodiment.
Figure 25:
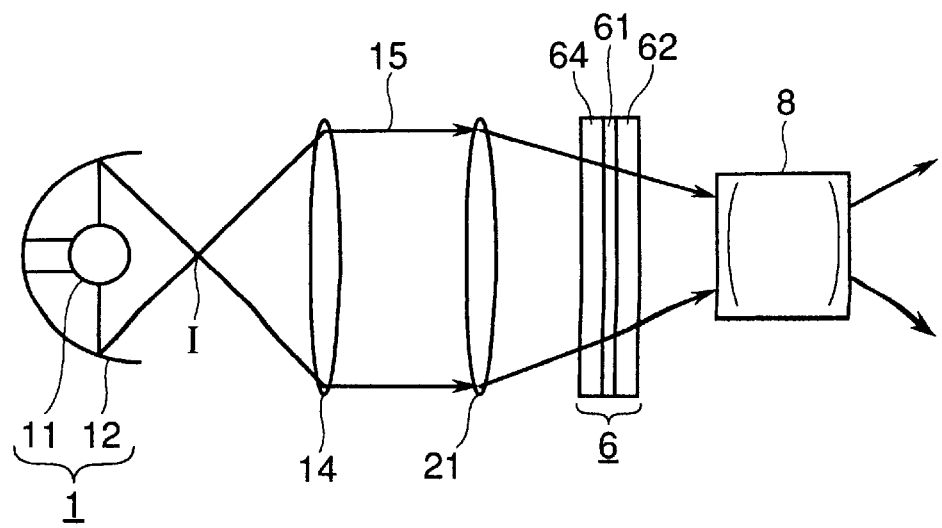
FIG. 25 illustrates an optical system of a prior art projection type display apparatus using a single liquid crystal light valve.

FIG. 24 illustrates an optical system of a fifteenth embodiment of a projection type display apparatus according to the present invention. Elements similar to those in FIGS. 11 and 26 have been given similar reference numerals. Adhesive layers are depicted at 57R, 57G, and 57B. The fifteenth embodiment is an embodiment where the construction in the eighth embodiment shown in FIG. 11 is applied to a projection type display apparatus using three liquid crystal light valves. The operation and advantages of the eighth embodiment offer a projection type display apparatus where the image-forming area of the three liquid crystal light valves are properly controlled to be within their optimum operating temperature ranges.

While the first to fifteenth embodiments have been described with respect to a projection type display apparatus using a rear projection type liquid crystal light valve, the present invention is also applicable to a projection type display apparatus using a reflection type liquid crystal light valve while still providing similar results.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A projection type display apparatus, comprising:
   a liquid crystal light valve employing a liquid crystal material having a temperature dependent optical characteristic in a single phase and having a light-incident side, upon which an illumination luminous flux is incident, a light-exiting side and an image-forming area sandwiched therebetween, an illumination luminous flux being incident upon the light-incident side, passing through the image-forming area, and exiting the light exiting side said liquid crystal light valve being operated with said liquid crystal material in a single phase;
   a heater, heating said liquid crystal light valve to increase a temperature of the image-forming area; and
   a temperature controller, controlling an amount of heat transferred to said liquid crystal light valve so that a temperature of said liquid crystal light valve is maintained within a predetermined temperature range, stabilizing temperature dependent optical characteristics of said liquid crystal material.

2. The projection type display apparatus according to claim 1, wherein said heater includes a transparent electrically conductive film, formed on a transparent substrate and a power supply supplying electric power to said transparent electrically conductive film, said transparent substrate being disposed on one of the light-incident side and the light-exiting side of said liquid crystal light valve;
   said temperature controller including,
      a temperature detector, detecting a temperature of said liquid crystal light valve; and
      a current controller, controlling a supply of current to said transparent electrically conductive film such that the temperature detected by said temperature detector is within the predetermined temperature range.

3. The projection type display apparatus according to claim 2, wherein said transparent electrically conductive film is made of indium tin oxide.

4. The projection type display apparatus according to claim 2, wherein said transparent electrically conductive film is substantially the same size as said image-forming area and is of a rectangular shape having long sides and short sides, said transparent electrically conductive film having electrodes extending along the long sides and connected to said power supply.

5. The projection type display apparatus according to claim 1, wherein said transparent electrically conductive film opposes said liquid crystal light valve so as to form a gap between said transparent electrically conductive film and said liquid crystal light valve.

6. The projection type display apparatus according to claim 2, wherein said transparent substrate is disposed in close contact with said liquid crystal light valve.

7. The projection type display apparatus according to claim 2, wherein said transparent electrically conductive film is formed on one of a side of said transparent substrate remote from said image forming area and a side of said transparent substrate directly facing said image-forming area.

8. The projection type display apparatus according to claim 2, wherein said transparent substrate is in close contact with a surface of said liquid crystal light valve through which the illumination luminous flux passes, said transparent substrate being bonded to the surface by a heat conductive transparent adhesive.

9. The projection type display apparatus according to claim 8, wherein said heat conductive transparent adhesive is a silicone adhesive.

10. The projection type display apparatus according to claim 8, wherein said heat conductive transparent adhesive is a visible-light-curing adhesive.

11. The projection type display apparatus according to claim 8, wherein said heat conductive transparent adhesive is an epoxy adhesive.

12. The projection type display apparatus according to claim 8, wherein said heat conductive transparent adhesive has a refractive index Nd in the range of $1.35 \leq Nd \leq 1.75$.

13. The projection type display apparatus according to claim 1, wherein said heater utilizes heat rays contained in the illumination luminous flux to heat said liquid crystal light valve;
   said temperature controller including,
      a temperature detector which detects the temperature of said liquid crystal light valve, and
      an amount-of-heat rays controller which controls an amount of the heat rays illuminating said liquid crystal light valve in accordance with the temperature detected by said temperature detector so that the temperature of said liquid crystal light valve is maintained within the predetermined temperature range.

14. The projection type display apparatus according to claim 13, wherein said heater includes a filter through which the illumination luminous flux is incident upon said liquid crystal light valve, said filter being adapted to incline so that the illumination luminous flux is incident at an incidence angle with said filter, said filter passing substantially only visible light when said incidence angle is within a predetermined range, and passing the visible light and a progressively larger amount of the heat rays with increasing deviation of said incidence angle from said predetermined range.

15. The projection type display apparatus according to claim 14, wherein said amount-of-heat rays controller includes an inclination controller which causes said filter to incline to control an amount of the heat rays passing through said filter.

16. The projection type display apparatus according to claim 13, wherein said heater includes,
   a cold filter which reflects the visible light of the illumination luminous flux and passes heat rays of the illumination luminous flux, and
   a reflecting mirror which reflects the heat rays toward said liquid crystal light valve, said reflecting mirror being adapted to incline relative to an angle of the heat rays so as to control an amount of the heat rays reflected toward said liquid crystal light valve.

17. The projection type display apparatus according to claim 16, wherein said amount-of-heat rays controller includes an inclination controller which causes said reflecting mirror to incline relative to the angle of the heat rays to control the amount of the heat rays reflected toward said liquid crystal light valve.

18. The projection type display apparatus according to claim 1, wherein said liquid crystal light valve includes a polymer-dispersed liquid crystal having dispersive power which varies in accordance with a voltage applied thereto.

19. The projection type display apparatus according to claim 1, further comprising two additional liquid crystal light valves, each having a corresponding heater interposed therewith and a corresponding temperature controller operatively connected to the corresponding heater.

20. A multi-projection type display system, comprising:
   at least two liquid crystal light valves, each employing a liquid crystal material having a temperature dependent optical characteristic within a single phase and having a light-incident side, upon which an illumination luminous flux being incident upon the light-incident side, passing through the image-forming area, and exiting the light-exiting side, said liquid crystal light valve being operated with said liquid crystal material in a single phase:

at least two heaters, each heating a corresponding one of said at least two liquid crystal light valves to increase the temperature of each of said at least two liquid crystal light valves is maintained within a predetermined temperature range;

a color separator, separating the illumination luminous flux from a light source into at least two colors of light, each of which is incident upon a corresponding one of said at least two liquid crystal light valves;

a color synthesizer, disposed between each of said at least two liquid crystal light valves and said projection lens, said color synthesizer synthesizing the at least two colors of light exiting each of said at least two liquid crystal light valves into an image; and a projection lens, enlarging and projecting the image emitted by said color synthesizer.

* * * * *